US011868594B2

(12) United States Patent
Bowser et al.

(10) Patent No.: US 11,868,594 B2
(45) Date of Patent: *Jan. 9, 2024

(54) METHODS, SYSTEMS, AND MEDIA FOR SPECIFYING DIFFERENT CONTENT MANAGEMENT TECHNIQUES ACROSS VARIOUS PUBLISHING PLATFORMS

(71) Applicant: Integral Ad Science, Inc., New York, NY (US)

(72) Inventors: Aubrey Bowser, Jersey City, NJ (US); Gustavo Magalhaes, Newark, NJ (US); Dhanush Kumar Soundarapandyan, Clifton, NJ (US); Micah Freedman, Sausalito, CA (US)

(73) Assignee: Integral Ad Science, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,006

(22) Filed: Dec. 30, 2022

(65) Prior Publication Data

US 2023/0152953 A1 May 18, 2023

Related U.S. Application Data

(63) Continuation of application No. 17/169,156, filed on Feb. 5, 2021, now Pat. No. 11,543,946, which is a
(Continued)

(51) Int. Cl.
*G06F 3/0481* (2022.01)
*G06F 3/04842* (2022.01)
*H04L 67/02* (2022.01)

(52) U.S. Cl.
CPC ........ *G06F 3/04842* (2013.01); *G06F 3/0481* (2013.01); *H04L 67/02* (2013.01)

(58) Field of Classification Search
CPC ..... G06F 3/04842; G06F 3/0481; H04L 67/02
See application file for complete search history.

(56) References Cited

U.S. PATENT DOCUMENTS

| 7,962,363 | B2 * | 6/2011 | Patel | ................. G06Q 30/0247 |
| | | | | 705/14.69 |
| 8,219,555 | B1 | 7/2012 | Mianji | |

(Continued)

OTHER PUBLICATIONS

Notice of Allowance dated Sep. 1, 2022 in U.S. App. No. 17/169,156, pp. 1-34.

(Continued)

*Primary Examiner* — Phenuel S Salomon
(74) *Attorney, Agent, or Firm* — Byrne Poh LLP

(57) ABSTRACT

Methods, systems, and media for specifying different content management techniques across various publishing platforms are provided. In some embodiments, the method comprises: receiving information about content placements; generating a user interface that includes the information and selectable content management options; receiving a selection of a first content management option for a first content placement; configuring a tag for the first content placement, wherein the tag is associated with instructions for executing the first content management option; receiving, from a web browser that loaded a web page including the first content placement, a request for the instructions for executing the first content management option; and sending the instructions to the web browser to execute the instructions and send information about the web page to a location indicated by the instructions.

21 Claims, 6 Drawing Sheets

Related U.S. Application Data continuation of application No. 15/096,195, filed on Apr. 11, 2016, now Pat. No. 10,915,232.

(60) Provisional application No. 62/145,180, filed on Apr. 9, 2015.

(56) References Cited

U.S. PATENT DOCUMENTS

| | | | |
|---|---|---|---|
| 8,423,405 B1 | 4/2013 | Gopalratnam et al. | |
| 8,571,930 B1 | 10/2013 | Galperin et al. | |
| 9,202,217 B2* | 12/2015 | Altberg | G06Q 30/02 |
| 2001/0047384 A1* | 11/2001 | Croy | H04L 67/306 |
| | | | 715/727 |
| 2003/0093790 A1* | 5/2003 | Logan | H04N 21/6125 |
| | | | 348/E7.071 |
| 2004/0260767 A1* | 12/2004 | Kedem | G06Q 30/0264 |
| | | | 705/14.42 |
| 2006/0212350 A1* | 9/2006 | Ellis | G06Q 30/0254 |
| | | | 705/14.66 |
| 2008/0147456 A1* | 6/2008 | Broder | G06Q 30/0248 |
| | | | 705/14.47 |
| 2008/0163071 A1 | 7/2008 | Abbott et al. | |
| 2008/0249841 A1* | 10/2008 | Ruark | G06Q 30/02 |
| | | | 705/7.29 |
| 2009/0064183 A1* | 3/2009 | Chijiiwa | G06Q 10/10 |
| | | | 719/314 |
| 2009/0171948 A1* | 7/2009 | Solomon | G06Q 30/02 |
| | | | 707/999.005 |
| 2009/0216619 A1 | 8/2009 | Tavernier | |
| 2009/0265243 A1* | 10/2009 | Karassner | G06Q 30/0275 |
| | | | 705/14.54 |
| 2010/0076811 A1* | 3/2010 | Keller | G06Q 30/00 |
| | | | 705/14.42 |
| 2010/0174603 A1* | 7/2010 | Hughes | G06Q 30/02 |
| | | | 705/14.42 |
| 2010/0262484 A1 | 10/2010 | Bardin et al. | |
| 2010/0293063 A1* | 11/2010 | Atherton | G06Q 30/02 |
| | | | 705/14.73 |
| 2011/0099076 A1 | 4/2011 | Repas | |
| 2011/0125594 A1* | 5/2011 | Brown | G06Q 30/0241 |
| | | | 705/14.73 |
| 2011/0288928 A1 | 11/2011 | Patwa et al. | |
| 2012/0078711 A1 | 3/2012 | Mehta et al. | |
| 2013/0218874 A1 | 8/2013 | Liggett et al. | |
| 2013/0276025 A1 | 10/2013 | Sherwin et al. | |
| 2014/0196081 A1 | 7/2014 | Emans et al. | |
| 2014/0263677 A1 | 9/2014 | Divringi et al. | |
| 2015/0046254 A1 | 2/2015 | Raab et al. | |
| 2016/0042611 A1 | 2/2016 | Abrahams et al. | |
| 2016/0253710 A1* | 9/2016 | Publicover | H04N 21/2187 |
| | | | 705/14.66 |

OTHER PUBLICATIONS

Notice of Allowance dated Oct. 2, 2020 in U.S. App. No. 15/096,195, pp. 2-9.

Office Action dated Mar. 18, 2020 in U.S. App. No. 15/096,195, pp. 2-11.

Office Action dated Apr. 14, 2022 in U.S. Appl. No. 17/169,156, pp. 2-9.

Office Action dated May 15, 2019 in U.S. App. No. 15/096,195, pp. 2-10.

Office Action dated Jul. 26, 2018 in U.S. App. No. 15/096,195, pp. 2-12.

Office Action dated Nov. 27, 2019 in U.S. App. No. 15/096,195, pp. 2-9.

* cited by examiner

METHODS, SYSTEMS, AND MEDIA FOR SPECIFYING DIFFERENT CONTENT MANAGEMENT TECHNIQUES ACROSS VARIOUS PUBLISHING PLATFORMS

CROSS-REFERENCE TO RELATED APPLICATIONS

This application is a continuation of U.S. patent application Ser. No. 17/169,156, filed Feb. 5, 2021, which is a continuation of U.S. patent application Ser. No. 15/096,195, filed Apr. 11, 2016, which claims the benefit of U.S. Provisional Patent Application No. 62/145,180, filed Apr. 9, 2015, each of which is hereby incorporated by reference herein in its entirety.

TECHNICAL FIELD

Methods, systems, and media for specifying different content management techniques across various publishing platforms are provided.

BACKGROUND

Online advertising is a large and growing business that often allows an advertiser to target particular users that are accessing a partner publisher's web page. Many advertisers wish to use techniques to monitor when their advertisements are presented to users, control whether certain of their advertisements are presented alongside other content, and/or to otherwise track the use or effectiveness of their advertisements. Certain service providers provide software and/or other services (such as advertising tags) that can be used to perform such functions, where different techniques can be used to perform different functions. However, typically a technique is applied to all advertisement placements associated with a publisher, and if an advertiser wants to use a different technique manual editing is required. As such, using different techniques for advertising placements from the same publisher can be a time consuming and expensive undertaking.

Accordingly, it is desirable to provide methods, systems, and media for specifying different content management techniques across different publishing platforms.

SUMMARY

In accordance with some embodiments of the disclosed subject matter, mechanisms for specifying different content management techniques across different publishing platforms are provided.

In accordance with some embodiments of the disclose subject matter, a method for managing content placement is provided, the method comprising: receiving information about a plurality of content placements each associated with one of a plurality of publishing platforms; generating a user interface that includes at least a portion of the information for each of the plurality of content placements and a plurality of selectable content management options for each of the plurality of content placements; causing the user interface to be presented by a first user device; receiving, from the first user device, a selection of a first content management option of the plurality of content management options for a first content placement of the plurality of content placements; configuring a tag to be associated with the first content placement, wherein the tag is associated with instructions for executing the first content management option; associating the tag with the first content placement, such that the tag is to be served in response to a request for content associated with the first content placement; sending the tag to the first user device in association with information about the first content placement; receiving, from a web browser being executed by a second user device that loaded a web page including the first content placement, a request for the instructions for executing the first content management option; and sending the instructions to the second user device such that the web browser executes the instructions and sends information about the web page to a location remote from the second user device indicated by the instructions.

In accordance with some embodiments of the disclosed subject matter, a system for managing content placement is provided, the system comprising: a hardware processor that is programmed to: receive information about a plurality of content placements each associated with one of a plurality of publishing platforms; generate a user interface that includes at least a portion of the information for each of the plurality of content placements and a plurality of selectable content management options for each of the plurality of content placements; cause the user interface to be presented by a first user device; receive, from the first user device, a selection of a first content management option of the plurality of content management options for a first content placement of the plurality of content placements; configure a tag to be associated with the first content placement, wherein the tag is associated with instructions for executing the first content management option; associate the tag with the first content placement, such that the tag is to be served in response to a request for content associated with the first content placement; send the tag to the first user device in association with information about the first content placement; receive, from a web browser being executed by a second user device that loaded a web page including the first content placement, a request for the instructions for executing the first content management option; and send the instructions to the second user device such that the web browser executes the instructions and sends information about the web page to a location remote from the second user device indicated by the instructions.

In accordance with some embodiments of the disclosed subject matter, a non-transitory computer-readable medium containing computer executable instructions that, when executed by a processor, cause the processor to perform a method for managing content placement is provided, the method comprising: receiving information about a plurality of content placements each associated with one of a plurality of publishing platforms; generating a user interface that includes at least a portion of the information for each of the plurality of content placements and a plurality of selectable content management options for each of the plurality of content placements; causing the user interface to be presented by a first user device; receiving, from the first user device, a selection of a first content management option of the plurality of content management options for a first content placement of the plurality of content placements; configuring a tag to be associated with the first content placement, wherein the tag is associated with instructions for executing the first content management option; associating the tag with the first content placement, such that the tag is to be served in response to a request for content associated with the first content placement; sending the tag to the first user device in association with information about the first content placement; receiving, from a web browser being executed by a second user device that loaded a web page including the first content placement, a request for the instructions for executing the first content management option; and sending the instructions to the second user device such that the web browser executes the instructions and sends information about the web page to a location remote from the second user device indicated by the instructions.

In some embodiments, the information about the plurality of content placements includes information identifying the size of each of the plurality of content placements.

In some embodiments, configuring the tag further comprises: receiving tag information from the first user device; and modifying the tag information based on the selection of the content management option.

In some embodiments, the tag includes an address for requesting content, and wherein the request for the instructions is sent to the address.

In some embodiments, the request for the instructions is associated with a request for content, and wherein the method further comprises blocking the content from being presented by the web browser based on the information about the web page.

In some embodiments, the method further comprises selecting a content management option for each of the plurality of content placements without user intervention based on the information about the plurality of content placements, wherein the selection of the first content management option of the plurality of content management options for the first content placement is of a content management option other than the content management option selected without user intervention.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
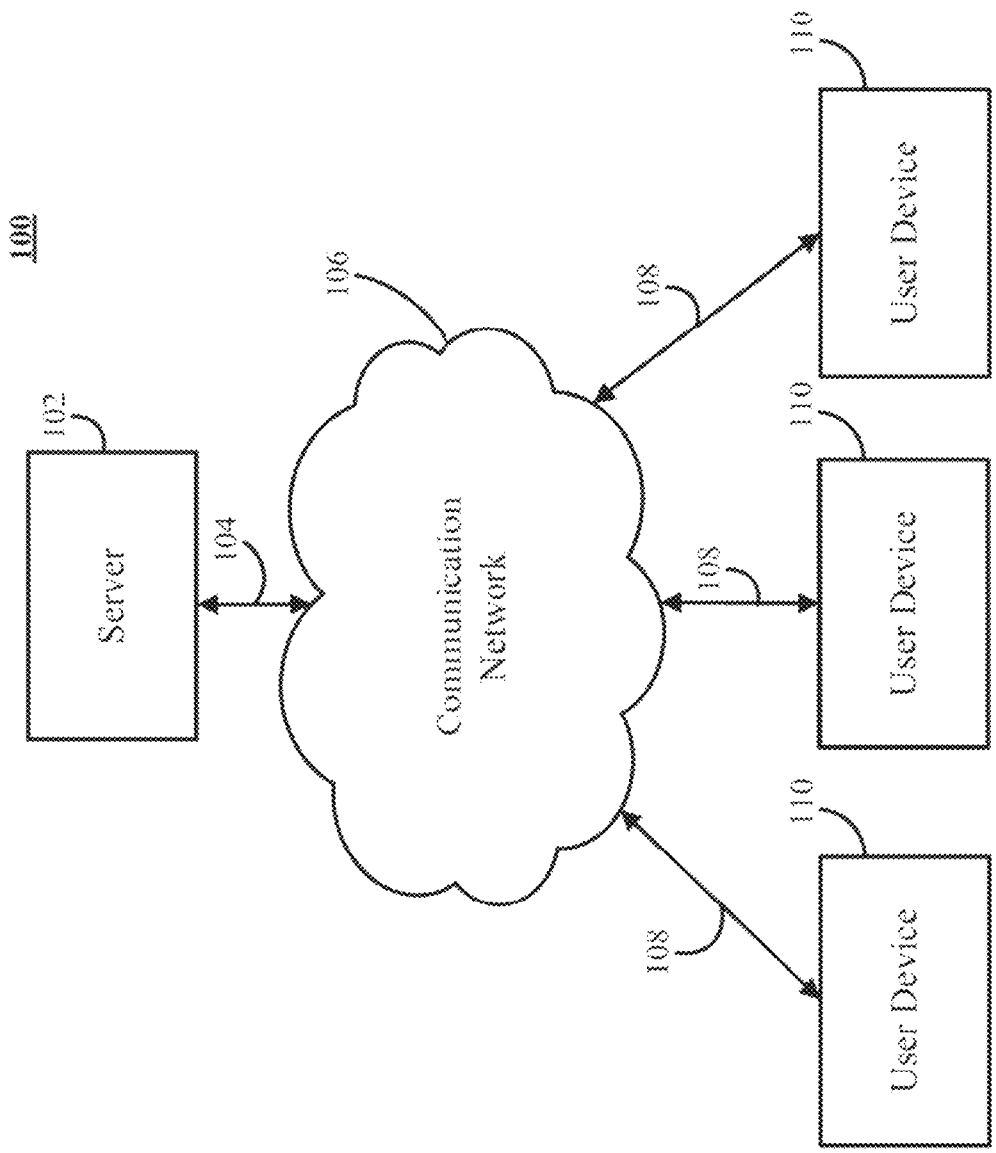
FIG. 1 shows an example of a generalized schematic diagram of a system on which the mechanisms for specifying different content management techniques across various publishing platforms as described herein can be implemented in accordance with some embodiments of the disclosed subject matter.

In accordance with some embodiments of the disclosed subject matter, mechanisms (which can include methods, systems, and media) for specifying different advertising management techniques on an advertisement placement level are provided.

In some embodiments, the mechanisms described herein can receive information about content (e.g., advertisement placements) that are to be associated with one or more content management (e.g., advertising management) techniques. For example, the mechanisms described herein can receive a spreadsheet that includes information about various platforms on which the content may be published (e.g., advertisement placements that may be made available by one or more publishers). In such an example, the spreadsheet can include information about each placement such as an identification number assigned by an advertising service that is to be used to fill the placements, a name of the placement provided by the publisher, the size of the placement, and/or any other suitable information. In some embodiments, the platforms on which the content (e.g., an advertisement to be placed in an advertisement placement) is to be published can include any suitable platform, such as a web page, a media item (e.g., a video, an audio recording, a text object such as a blog post), an application for accessing content from one or more particular sources, an application for playing a game, etc. In some embodiments, a publishing platform can be associated with multiple opportunities to place content (e.g., multiple advertising placements).

The mechanisms described herein can be used with any suitable content management techniques. For example, the mechanisms described herein can be used with passive advertising management techniques, such as monitoring techniques which can be used to monitor a web page in which the advertisement placement appears and/or to monitor other advertisement placements on the web page. As another example, the mechanisms described herein can be used with active advertising management techniques, such as techniques for preventing an advertisement from being presented when objectionable content is detected on the web page on which the advertisement is to be presented, techniques for inhibiting an advertisement from being presented when a competitors advertisement is detected on that same web page, techniques for inhibiting more than a predetermined number of advertisements from being presented to the same user, and/or any other suitable active advertising management techniques. Examples of advertising management techniques are disclosed in Luttrell et al. U.S. Pat. No. 8,595,072 and Freedman et al. U.S. patent application Ser. No. 13/749,472, each of which is incorporated by reference herein in its entirety.

In some embodiments, upon receiving the information about the advertisement placements, the mechanisms described herein can extract the information and assign one or more preliminary advertising management techniques. For example, for advertisement placements intended to be used for tracking pixels (e.g., a 1×1 advertisement placement), the mechanisms described herein can assign monitoring. As another example, for advertisement placements intended for use with banner advertisements, the mechanisms described herein can assign blocking of advertisements when the web page includes content that the advertiser wishes to avoid associating with their brand. As yet another example, for advertisement placements intended to be used for homepage takeover advertising (e.g., upon purchasing all or substantially all of the advertisement placements on a given web page), the mechanisms described herein can assign monitoring as blocking may not be appropriate for such advertising. As still another example, for advertisement placements associated with a publisher that does not support blocking techniques, the mechanisms described herein can assign monitoring.

In some embodiments, the mechanisms described herein can present at least a portion of the extracted information to a user in a user interface for specifying one or more advertising management techniques to be used with each advertising placement. For example, the mechanisms described herein can present the preliminary advertising management techniques that have been assigned, such as monitoring for tracking pixel placements, and blocking for banner advertisement placements. In such an example, the preliminary assignments can be presented to a user using the user interface, and user input can be received to alter one or more of the preliminary assignments.

In some embodiments, the mechanisms described herein can receive user input indicating that the specified advertising management techniques are to be applied to the advertisement placements. Additionally, in some embodiments, the mechanisms described herein can, without further user input, create advertising tags that can be used to implement the specified advertising management techniques. For example, such advertising tags can then be used when advertisements are placed with a publisher such that the advertising management techniques are implemented for that advertisement.

FIG. 1 shows an example 100 of a generalized schematic diagram of a system on which the mechanisms for specifying different content management techniques across various publishing platforms as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for specifying different advertising management techniques on an advertisement placement level, such as a processor, a computer, a data processing device, or any suitable combination of such devices. For example, the mechanisms for specifying different content management techniques across various publishing platforms can be distributed into multiple backend components and multiple frontend components and/or user interfaces. In a more particular example, backend components, such as mechanisms for receiving information related to one or more advertising placements on various publishing platforms, parsing the information related to one or more advertising placements, providing a user interface for specifying one or more advertising management techniques to associate with an advertising placement, receiving information specifying which of one or more advertising management techniques to associate with an advertising placement, etc., can be performed on one or more servers 102. In another more particular example, frontend components, such as presentation of the user interface, initiating the mechanisms for specifying different advertising management techniques on an advertisement placement level, receiving use input to specify one or more advertising management techniques to associate with an advertising placement, etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a personal computer, a laptop computer, a smartphone, a tablet computer, a mobile telephone, a wearable computer, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for generating contextually relevant messages.

Figure 2:
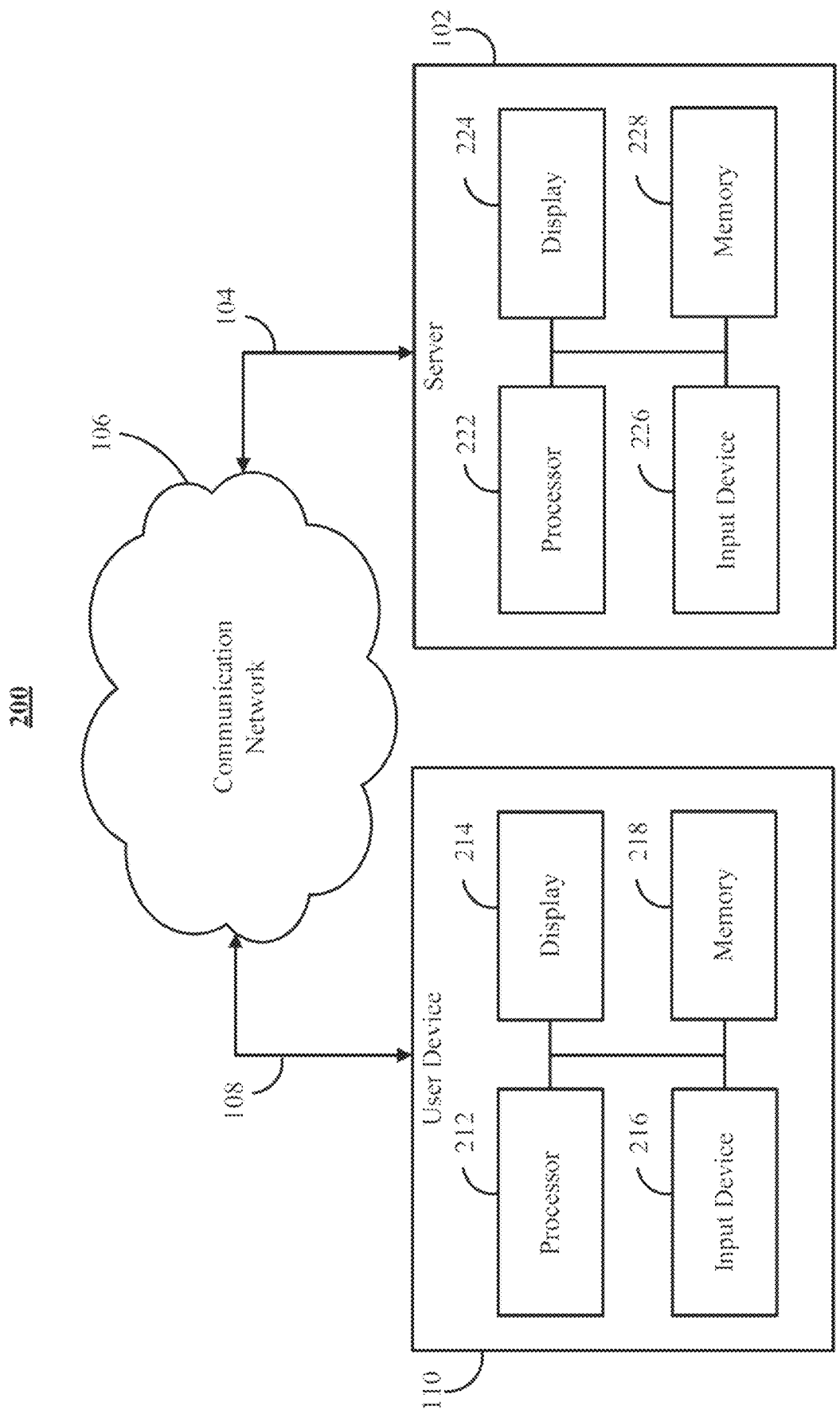
FIG. 2 shows an example of hardware that can be used to implement one or more of the user devices, and servers depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for downloading and/or saving information about advertisement placements from a publisher and/or advertising platform, uploading and/or transmitting the information about advertisement placements to server 102, presenting a user interface for specifying one or more advertising management techniques for the advertisement placements associated with the information about the advertisement placements, causing selections of advertising management techniques to be saved, communicating the specified advertising management techniques to an advertising platform that is used to place advertisements in the advertising placements, sending and receiving data through communications link 108, and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., user instructions to specify one or more advertising management techniques for particular advertising placements, etc.), and hardware processor 222 can receive information about advertising placements from user devices 110, (e.g., as described below in connection with process 300 of FIG. 3). In some embodiments, the server program can cause hardware processor 222 to, for example, execute one or more portions of process 300 as described below in connection with FIG. 3.

Hardware processor 222 can use the server program to communicate with user devices 110 as well as provide access to and/or copies of the mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for providing video content suitable for audio-only playback. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
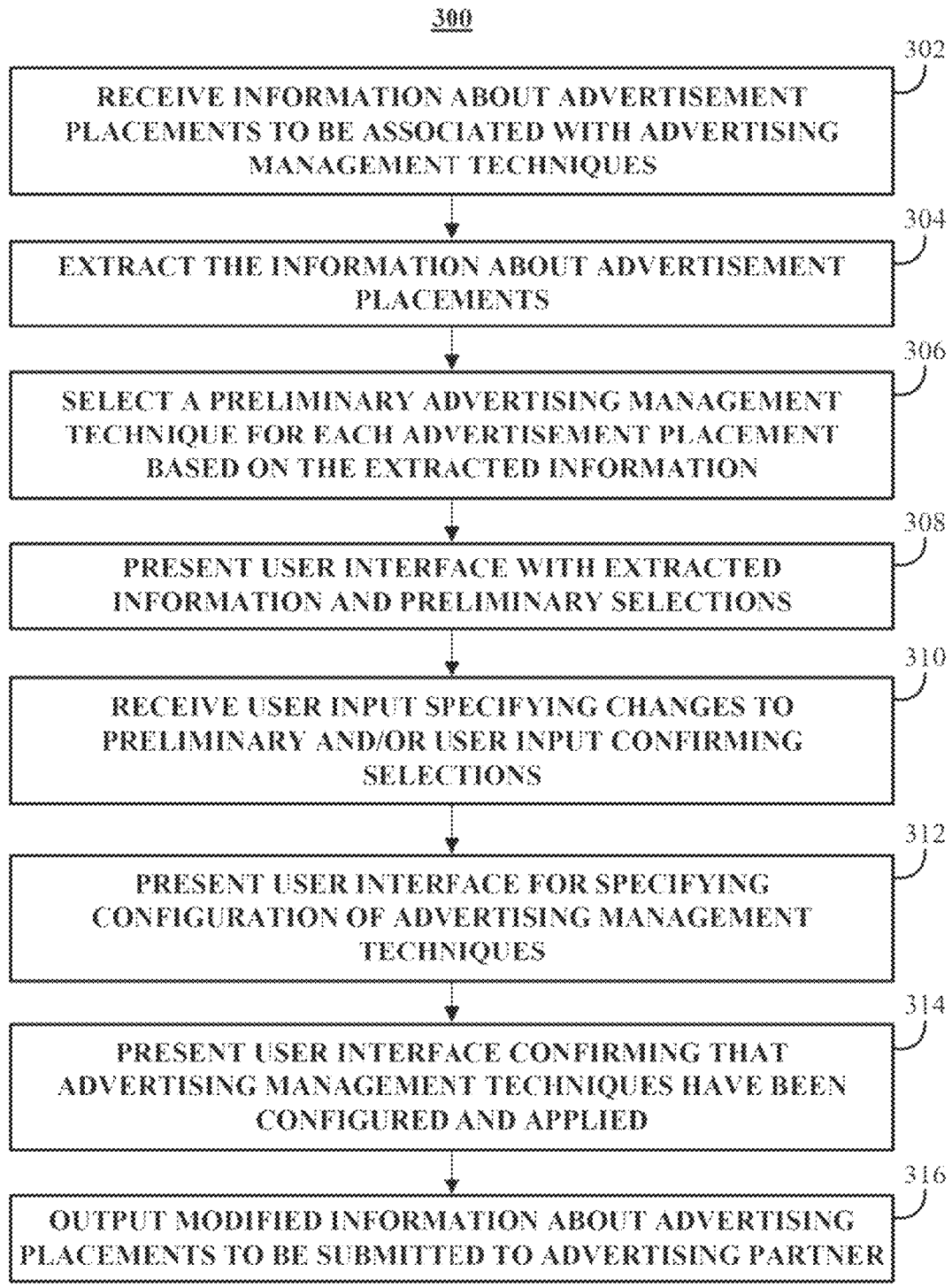
FIG. 3 shows an example of a process for specifying different content management techniques across various publishing platforms in accordance with some embodiments of the disclosed subject matter.

Turning to FIG. 3, an example 300 of a process for specifying different content management techniques across various publishing platforms is shown in accordance with some embodiments of the disclosed subject matter. As shown in FIG. 3, at 302, process 300 can receive information about advertisement placements that are to be associated with advertising management techniques. In some embodiments, the information about the advertisement placements can be received in any suitable format. For example, in some embodiments, the information about the advertisement placements can be received as a spreadsheet that includes information about the advertisement placements in columns and rows (e.g., as described below in connection with FIG. 4A). As another example, the information about the advertisements can be received as a text document (e.g., a file in a format such as .txt. or .doc, an HTML document, an XML document, etc.). As yet another example, the information about the advertisements can be received from a database of information about the advertisements.

In some embodiments, the information about the advertisement placements can be received from any suitable source. For example, the information about the advertisement placements can be uploaded from a user device (e.g., as a spreadsheet, a text document, etc.). As another example, the information about the advertisement placements can be received as input from a user device (e.g., by a user pasting the information from a spreadsheet or text document). As yet another example, the information about the advertisement placements can be received from a source identified by a user device. In a more particular example, a user device can submit any suitable information for identifying a source of information about the advertisement placements, such as a uniform resource locator (URL), identifying information of a service from which the information about the advertisement is available (e.g., DOUBLECLICK, OPENX, etc.), information that can be used to identify the specific information about advertising placements that are to be retrieved, etc. In such an example, the information about the advertisements can be retrieved by a device executing at least a portion of process 300 in response to the information received by the user device.

At 304, process 300 can extract the information about the advertisement placements from the received information. In some embodiments, process 300 can use any suitable technique or combination of techniques to extract the information. For example, if the information is not in a form useable to directly present the information (e.g., if the information is received as a spreadsheet), process 300 can parse the information to extract the information that is to be used in specifying different advertising management techniques on an advertisement placement level. In a more particular example, process 300 can extract information about particular advertising placements, such as identifying information used by an advertising platform to identify a particular advertising placement, identifying information used by a publisher to identify the particular advertising platform, a size of the particular advertising placement, and/or any other suitable information about the advertising placement. In some embodiments, such as in cases in which the information about advertisement placements is received in a format that is useable by process 300 (e.g., through an application program interface), 304 can be omitted.

At 306, process 300 can assign a preliminary advertising management technique for each advertisement placement based on the extracted and/or received information about the advertisement placements. In some embodiments, process 300 can assign any suitable preliminary advertising management technique based on any suitable information about the advertisement placement. For example, in some embodiments, process 300 can assign a passive monitoring advertising management technique for a single pixel advertisement placement (e.g., a 1×1 placement) as this type of placement can generally be used for monitoring the web page with which the placement is associated and/or the status of other advertisement placements on the web page. As another example, in some embodiments, process 300 can assign an active advertising management technique for an advertising placement for a banner advertisement as the advertiser may be interested in actively determining whether to place an advertisement in the placement when the opportunity to do so arises.

In some embodiments, process 300 can determine which advertising management technique or techniques to assign for particular types of advertising placements based on user preferences and/or user information. For example, in some embodiments, process 300 can assign preliminary advertising management techniques based on saved user preferences. As another example, process 300 can assign preliminary advertising management techniques based on one or more advertising management techniques that are available for use by the advertiser (e.g., where multiple types of passive monitoring advertising management techniques and/ or multiple types of active advertising management techniques are available for use by the advertiser).

At 308, process 300 can cause a user interface with at least a portion of the extracted and/or received information to be presented with the preliminary advertising management technique assigned by process 300 for at least a portion of the advertisement placements. Process 300 can use any suitable user interface to present any suitable information about the advertising placements that was received and/or extracted and to present the preliminary assignments. For example, in some embodiments, process 300 can cause a user interface as described below in connection with FIG. 4A to be presented by a user device being used to specify which advertising management techniques are to be associated with the advertising placements.

At 310, process 300 can receive input specifying changes to the preliminary advertising management technique assignments and/or input confirming selections that have been made. In some embodiments, such input can be received using any suitable technique or combination of techniques. For example, as described below in connection with FIG. 4A, the user interface for specifying which advertising management techniques are to be associated with the advertising placements can include radio buttons associated with different advertising management techniques. In such an example, selection of a particular radio button based on user input at a user device presenting the user interface can be communicated to a device (e.g., server 102) at any suitable time (e.g., when the radio button is selected, periodically, when a "save" user interface element is selected, etc.).

At 312, process 300 can cause a user interface for specifying configuration information of the one or more advertising management techniques that were specified at 310 to be presented. In some embodiments, process 300 can cause any suitable user interface to be presented for specifying the configuration information, such as the user interface described below in connection with FIG. 4B. In some embodiments, process 300 can receive any suitable configuration information about the advertising management techniques. For example, process 300 can receive configuration information about what type or types of services that a provider (e.g., web site publisher) of the advertising placement supports. As another example, process 300 can receive configuration information about whether additional services or information are to be associated with the advertising management techniques specified at 310.

At 314, process 300 can cause a user interface for confirming that the specified advertising management techniques specified at 310 have been configured and applied with respect to the advertising placements. Process 300 can use any suitable user interface to present any suitable information confirming that the advertising management techniques have been configured and applied for the advertising placements identified by the information received at 302. For example, in some embodiments, process 300 can cause a user interface as described below in connection with FIG. 4C to be presented by a user device being used to specify which advertising management techniques are to be associated with the advertising placements.

At 316, process 300 can output modified information about advertising placements that is to be submitted to the advertising partner. In some embodiments, the modified information about the advertising placements can be output in any suitable format and can be output to any suitable device. For example, in some embodiments, the modified information about advertisement placements can be output in a format that is similar to a format in which the information about the advertisement placements was received at 302. In a more particular example, the modified information about advertisement placements can be output as a spreadsheet that is to be downloaded to a user device, which can then upload the spreadsheet to the service provider that is to be used to provide opportunities to place advertisements using the advertising placements. As another example, the modified information about advertisement placements can be output in a format that is suitable for transferring the data to the service provider that is to be used to provide opportunities to place advertisements using the advertising placements. In some embodiments, the modified information can include an advertising tag to be used in connection with an advertising placement and/or a modified advertising tag to be used in connection with the advertising placement.

At 318, process 300 can receive a request for content based on an advertising tag associated with an advertisement placement loaded by an application on a user device (e.g., user device 110). In some embodiments, the advertisement placement can be loaded by any suitable application, such as a web browser, an application for accessing content from one or more content publishers (e.g., made available from the one or more content publishers, made available from a third party, etc.), an application for playing a game, and/or any other suitable application.

In some embodiments, the advertising tag associated with the advertisement placement can be an address (e.g., such as a Universal Resource Locator) that is associated with the advertisement placement. In such embodiments, when the application loads content that includes the advertisement placement (e.g., a web page, a video, an audio recording, a game, etc.), the application can request content from the address included in the advertising tag.

At 320, process 300 can send the content and/or instructions for executing an advertising management technique associated with the advertisement placement. In some embodiments, the content sent in response to the request can include any suitable content, such as an image, an advertisement, an address for requesting further content (e.g., a redirect to an advertising server, an advertising service, etc.), instructions that cause the application to perform one or more operations, any other suitable content, or any suitable combination thereof.

In some embodiments, the instructions can include instructions (e.g., in a programming language such as JavaScript) that cause the application to send information about the web page (or other content that included the advertisement placement such as a video, an audio recording, a game, etc.). In such embodiments, the information can include, for example, the location of the advertisement placement within the web page (or other content), whether the advertisement placement is within the viewport that is currently being presented by the application, and/or any other suitable information about the advertisement placement and/or the web page (or other content) within which the advertisement placement is included.

In some embodiments, the instructions can include instructions (e.g., in a programming language such as JavaScript) that cause information to be sent to other advertisement placements on the web page (and/or to any other suitable portions of the web page such as iFrames included in the web page) and/or receive information from other advertisements (and/or to any other suitable portions of the web page such as iFrames included in the web page). In such embodiments, the information can include, for example, identifying information of the advertisement placement sending the information, information about the advertisement included (or to be included) in the advertisement placement, a location of the advertisement placement within the web page, etc.

In some embodiments, process 300 (and/or any other suitable process) can receive the information from the application and can perform one or more actions based on information received from the application and sent based on the instructions sent at 320. For example, process 300 (and/or any other suitable process) can block an advertisement from being presented in the advertisement placement and/or replace the advertisement (e.g., with another advertisement, a public service announcement, etc.) based on the information received from the application. In a more particular example, process 300 (and/or any other suitable process) can block the advertisement from being presented based on the content of the web page in which the advertisement placement is included (e.g., as described in Luttrell et al. U.S. Pat. No. 8,595,072). As another example, process 300 (and/or any other suitable process) can block the advertisement based on other advertisements presented within the web page based on the information received from the application. As yet another example, process 300 (and/or any other suitable process) can block the advertisement based on a particular number of advertisements being served in a campaign to a particular user, web page, etc., based on the information received from the application. As still another example, process 300 (and/or any other suitable process) can record the information received from the application in connection with the advertising placement.

In some embodiments, the instructions can include a location (e.g., any suitable address) to which the information is to be sent. For example, the information can be sent to an address associated with a server (e.g., server 102) executing process 300. As another example, the information can be sent to an address associated with another computing device (e.g., a server executing a process described in Luttrell et al. U.S. Pat. No. 8,595,072 or Freedman et al. U.S. patent application Ser. No. 13/749,472).

Figure 4A:
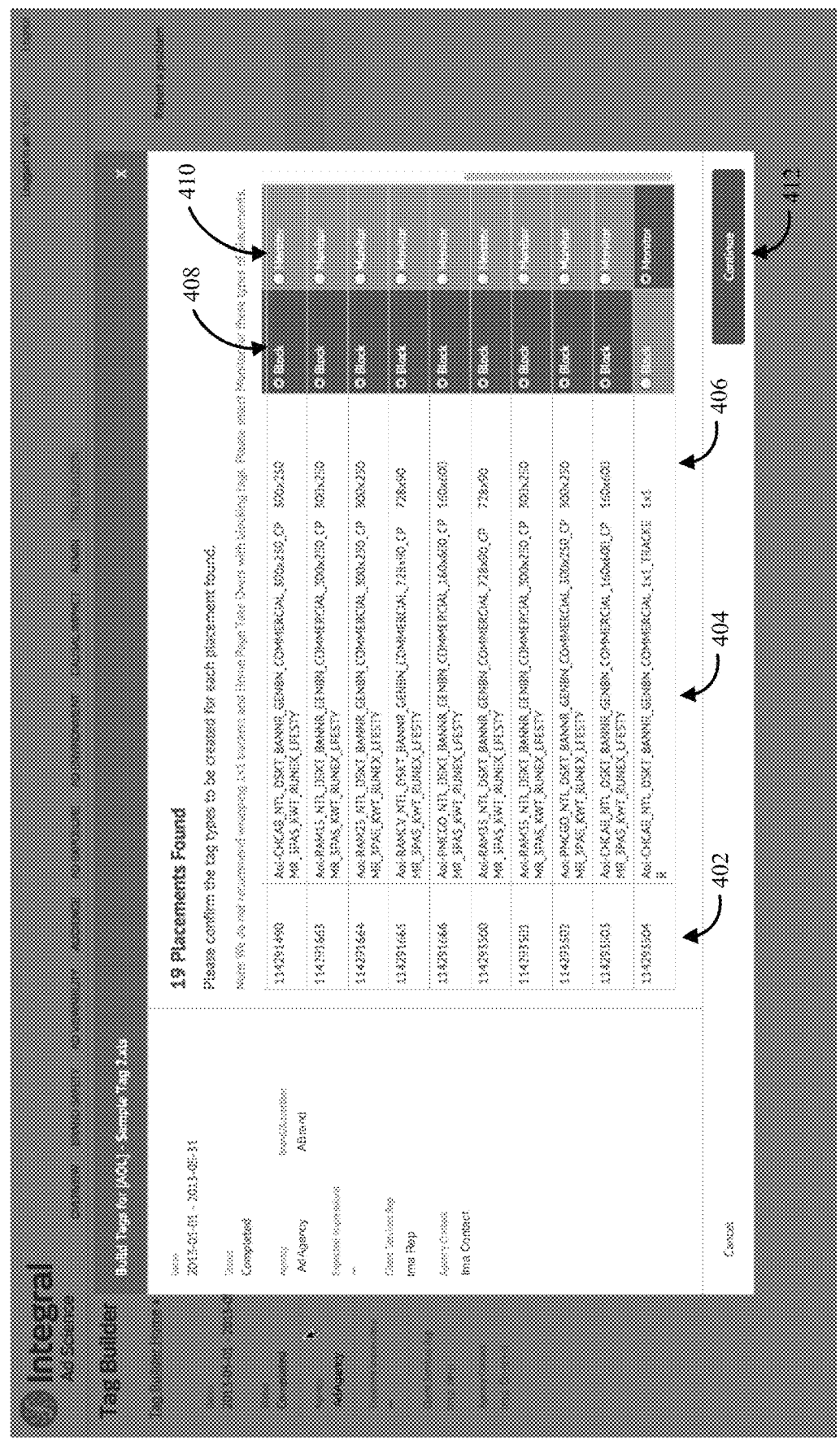
FIGS. 4A-4C show examples of user interfaces for specifying different content management techniques across various publishing platforms in accordance with some embodiments of the disclosed subject matter.

FIG. 4A shows an example 400 of a user interface for specifying different content management techniques on a content placement level in accordance with some embodiments of the disclosed subject matter. As shown in FIG. 4A, in some embodiments, user interface 400 can include information about advertising placements in columns 402-406. For example, column 402 can include identifying information used by an advertising platform to identify a particular advertising placement. As another example, column 404 can include identifying information used by a publisher to identify the particular advertising platform. As yet another example, column 406 can include information identifying a size associated with the advertising placement (e.g., in pixels).

In some embodiments, user interface 400 can include user interface elements 408 and 410 for each advertising placement, where user interface element 408 can be selected to apply a blocking technique to the advertising placement and user interface element 410 can be selected to apply a monitoring technique. As shown in FIG. 4A, in some embodiments, block 408 and monitor 410 can be mutually exclusive such that only one of the options can be selected. Additionally or alternatively, in some embodiments, multiple options can be selected, such as multiple active advertising management techniques.

In some embodiments, user interface 400 can include a continue user interface element 412, which can be selected to save the selections of block 408 or monitor 410 for each of the advertising placements.

Figure 4B:
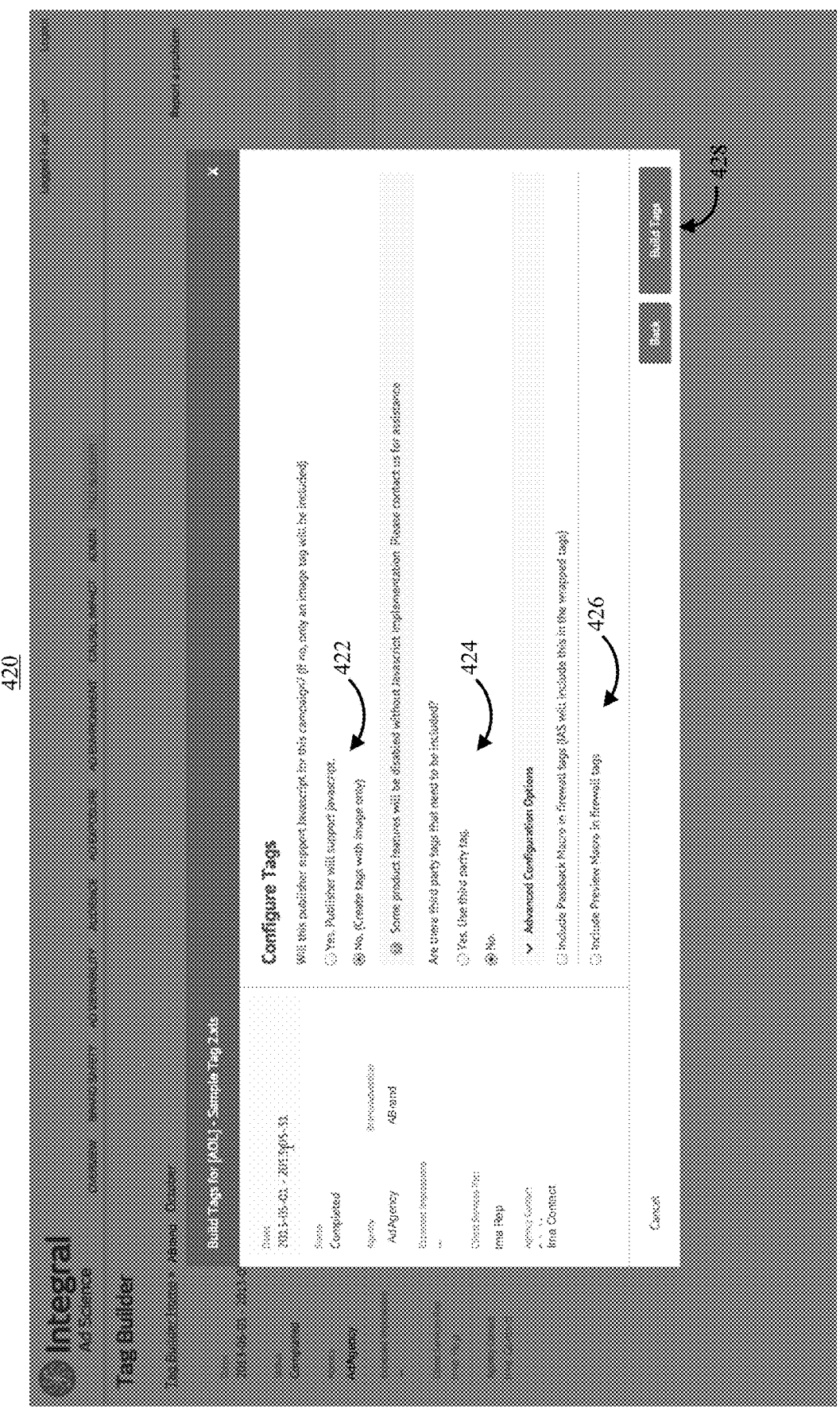

FIG. 4B shows an example 420 of a user interface for specifying configuration information of the one or more content management techniques in accordance with some embodiments of the disclosed subject matter. As shown in FIG. 4B, in some embodiments, user interface 420 can include user interface elements 422 for specifying whether the publisher will support certain services in association with the advertisement placement. For example, as shown in FIG. 4B, user interface elements 422 can be used to enter information indicating if the publisher will support JavaScript in the advertisement placement.

In some embodiments, user interface 420 can include user interface elements 424 for specifying whether additional information is to be added to an advertisement tag that is to be generated for use with the advertising placements. For example, as shown in FIG. 4B, user interface elements 424 can be used to specify whether an advertising tag from another source is to be used. In response to a selection indicating that an advertising tag from another source is to be used, a user interface for entering information identifying the advertising tag from another source can be presented.

In some embodiments, user interface 420 can include user interface elements 426 for specifying whether particular additional services are to be used in connection with the techniques specified using user interface 400.

In some embodiments, user interface 420 can include a user interface element 428, which can be selected to cause the configuration information selected using user interface 420 to be implemented for each of the advertising placements.

Figure 4C:
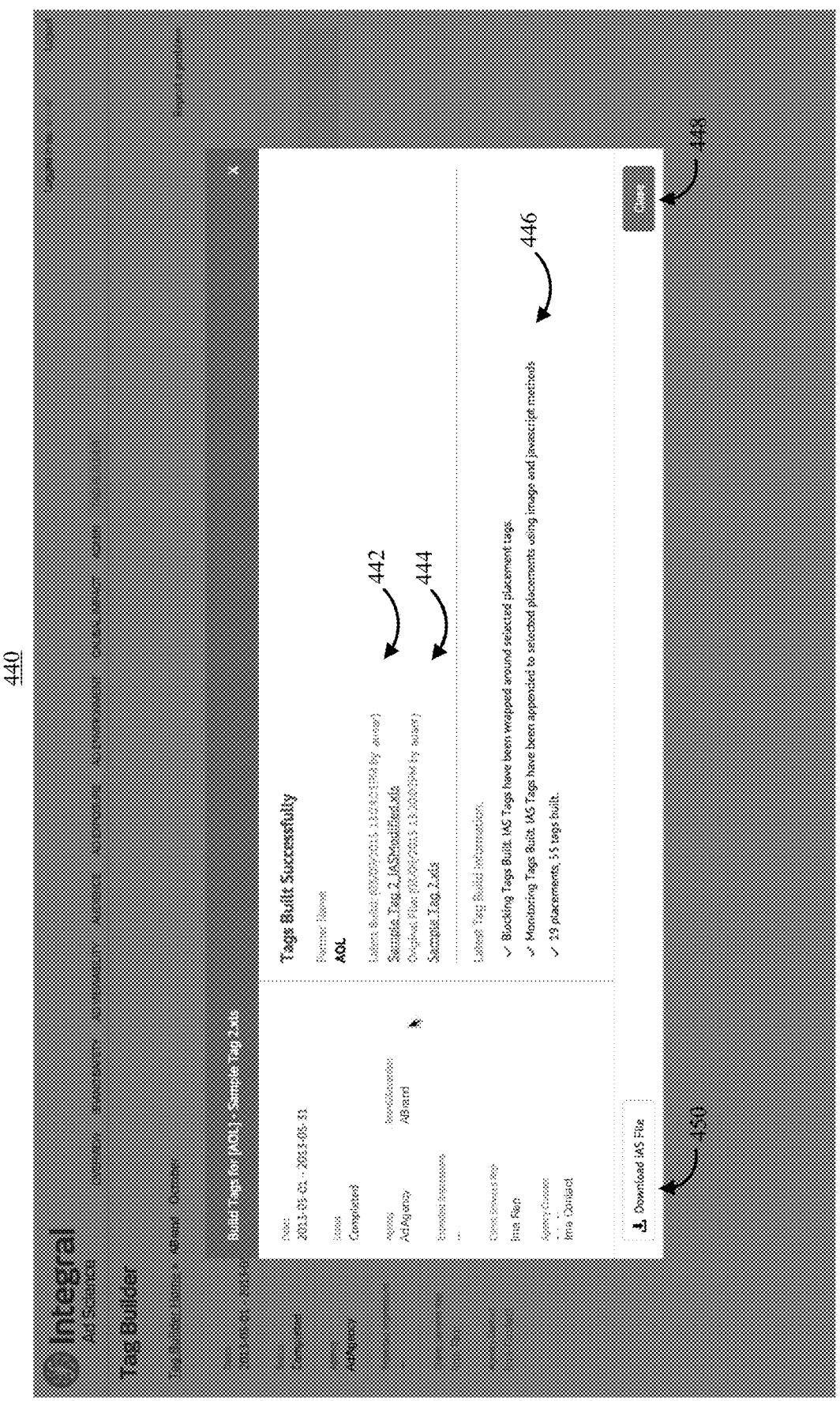

FIG. 4C shows an example 440 of a user interface for confirming that the content management techniques specified using user interface 400 have been configured and applied with respect to the content placements in accordance with some embodiments of the disclosed subject matter. As shown in FIG. 4C, in some embodiments, user interface 440 can include modified identifying information 442 that identifies the modified information about the advertising placements, and original identifying information 444 that identifies the information about the advertising placements received at 302.

In some embodiments, user interface 440 can include additional details 446 which can provide information to a user about what actions have been taken, whether particular types of advertising management techniques have been implemented, how many placements those techniques have been implemented for, how the advertising management techniques were configured (e.g., based on selections made using user interface 420).

In some embodiments, user interface 440 can include a user interface element 448 which can be selected to cause presentation of user interface 440 to be closed and/or otherwise inhibited.

In some embodiments, user interface 440 can include a user interface element 450 which can be selected to cause the modified information about advertisement placements to be downloaded to a user device that is presenting user interface 440.

In some embodiments, the mechanisms described herein can include server-side software, server-side hardware, client-side software, client-side hardware, or any suitable combination thereof. For example, the mechanisms described herein can encompass a computer program written in a programming language recognizable by server 102 and/or by user device 110 (e.g., a program written in a programming language, such as, Java, C, Objective-C, C++, C#, Javascript, Visual Basic, or any other suitable approaches). As another example, the mechanisms described herein can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIG. 3 can be executed or performed in any order or sequence not limited to the order and sequence shown and described in the figures. Also, some of the above steps of the processes of FIG. 3 can be executed or performed substantially simultaneously where appropriate or in parallel to reduce latency and processing times. It should also be noted that, as used herein, the term mechanism can encompass hardware, software, firmware, or any suitable combination thereof.

Accordingly, methods, systems, and media for specifying different content management techniques across various publishing platforms are provided.

Although the invention has been described and illustrated in the foregoing illustrative implementations, it is understood that the present disclosure has been made only by way of example, and that numerous changes in the details of implementation of the invention can be made without departing from the spirit and scope of the invention. Features of the disclosed implementations can be combined and rearranged in various ways.

What is claimed is:

1. A method for managing content placement, the method comprising:
    receiving, using a server that includes a hardware processor, information about a plurality of content placements each associated with one of a plurality of publishing platforms;
    assigning, using the hardware processor, a preliminary content management technique based on the received information for each of the plurality of content placements, wherein the preliminary content management technique is selected from a passive content management technique and an active content management technique, wherein the passive content management technique monitors a web page in which the content placement appears and monitors other content placements on the web page and wherein the active content management technique monitors the web page in which the content placement appears and inhibits the content placement on the web page in response to detecting particular content on the web page;
    receiving, using the hardware processor, from a first user device, a selection of a first content management option of a plurality of content management options that changes a first content placement of the plurality of content placements from the assigned preliminary content management technique to a different content management technique from the passive content management technique and the active content management technique;
    configuring, using the hardware processor, a tag for association with the first content placement, wherein the tag is associated with instructions for executing the different content management technique associated with the first content management option; and
    transmitting, using the hardware processor, the tag to the first user device in association with information about the first content placement.

2. The method of claim 1, wherein the particular content on the web page comprises one or more of: objectionable content on the web page, competitor content on the web page, and an indication that more than a predetermined number of content placements have been presented to a user.

3. The method of claim 1, further comprising:
    generating a user interface that includes at least a portion of the information for each of the plurality of content placements and a plurality of selectable content management options for each of the plurality of content placements, wherein each of the plurality of selectable content management options is initially set at an option that corresponds with the assigned preliminary content management technique; and
    transmitting the generated user interface to the first user device for presentation.

4. The method of claim 1, further comprising associating the tag with the first content placement such that the tag is served in response to a request for content associated with the first content placement.

5. The method of claim 1, further comprising:
    receiving, from a web browser being executed by a second user device that loaded the web page including the first content placement, a request for the instructions for executing the different content management technique associated with the first content management option; and
    transmitting the instructions to the second user device such that the web browser executes the instructions and sends information about the web page to a location remote from the second user device indicated by the instructions.

6. The method of claim 5, wherein the tag includes an address for requesting content, and wherein the request for the instructions is sent to the address.

7. The method of claim 5, wherein the request for the instructions is associated with a request for content, and wherein the method further comprises blocking the content from being presented by the web browser based on the information about the web page.

8. The method of claim 1, wherein configuring the tag further comprises:
    receiving tag information from the first user device; and
    modifying the tag information based on the selection of the content management option.

9. The method of claim 1, further comprising selecting a content management option for each of the plurality of content placements without user intervention based on the information about the plurality of content placements, wherein the selection of the first content management option of the plurality of content management options for the first content placement is of a content management option other than the content management option selected without user intervention.

10. The method of claim 1, wherein the information about the plurality of content placements includes information identifying the size of each of the plurality of content placements.

11. A system for managing content placement, the system comprising:
a server that includes a hardware processor, wherein the hardware processor is programmed to:
receive information about a plurality of content placements each associated with one of a plurality of publishing platforms;
assign a preliminary content management technique based on the received information for each of the plurality of content placements, wherein the preliminary content management technique is selected from a passive content management technique and an active content management technique, wherein the passive content management technique monitors a web page in which the content placement appears and monitors other content placements on the web page and wherein the active content management technique monitors the web page in which the content placement appears and inhibits the content placement on the web page in response to detecting particular content on the web page;
receive, from a first user device, a selection of a first content management option of a plurality of content management options that changes a first content placement of the plurality of content placements from the assigned preliminary content management technique to a different content management technique from the passive content management technique and the active content management technique;
configure a tag for association with the first content placement, wherein the tag is associated with instructions for executing the different content management technique associated with the first content management option; and
transmit the tag to the first user device in association with information about the first content placement.

12. The system of claim 11, wherein the particular content on the web page comprises one or more of: objectionable content on the web page, competitor content on the web page, and an indication that more than a predetermined number of content placements have been presented to a user.

13. The system of claim 11, wherein the hardware processor is further programmed to:
generate a user interface that includes at least a portion of the information for each of the plurality of content placements and a plurality of selectable content management options for each of the plurality of content placements, wherein each of the plurality of selectable content management options is initially set at an option that corresponds with the assigned preliminary content management technique; and
transmit the generated user interface to the first user device for presentation.

14. The system of claim 11, wherein the hardware processor is further programmed to associate the tag with the first content placement such that the tag is served in response to a request for content associated with the first content placement.

15. The system of claim 11, wherein the hardware processor is further programmed to:
receive, from a web browser being executed by a second user device that loaded the web page including the first content placement, a request for the instructions for executing the different content management technique associated with the first content management option; and
transmit the instructions to the second user device such that the web browser executes the instructions and sends information about the web page to a location remote from the second user device indicated by the instructions.

16. The system of claim 15, wherein the tag includes an address for requesting content, and wherein the request for the instructions is sent to the address.

17. The system of claim 15, wherein the request for the instructions is associated with a request for content, and wherein the hardware processor is further programmed to block the content from being presented by the web browser based on the information about the web page.

18. The system of claim 11, wherein configuring the tag further comprises:
receiving tag information from the first user device; and
modifying the tag information based on the selection of the content management option.

19. The system of claim 11, wherein the hardware processor is further programmed to select a content management option for each of the plurality of content placements without user intervention based on the information about the plurality of content placements, wherein the selection of the first content management option of the plurality of content management options for the first content placement is of a content management option other than the content management option selected without user intervention.

20. The system of claim 11, wherein the information about the plurality of content placements includes information identifying the size of each of the plurality of content placements.

21. A non-transitory computer-readable medium containing computer executable instructions that, when executed by a processor, cause the processor to perform a method for managing content placement, the method comprising:
receiving information about a plurality of content placements each associated with one of a plurality of publishing platforms;
assigning a preliminary content management technique based on the received information for each of the plurality of content placements, wherein the preliminary content management technique is selected from a passive content management technique and an active content management technique, wherein the passive content management technique monitors a web page in which the content placement appears and monitors other content placements on the web page and wherein the active content management technique monitors the web page in which the content placement appears and inhibits the content placement on the web page in response to detecting particular content on the web page;
receiving, from a first user device, a selection of a first content management option of a plurality of content management options that changes a first content placement of the plurality of content placements from the assigned preliminary content management technique to a different content management technique from the passive content management technique and the active content management technique;

configuring a tag for association with the first content placement, wherein the tag is associated with instructions for executing the different content management technique associated with the first content management option; and transmitting the tag to the first user device in association with information about the first content placement.

* * * * *